United States Patent [19]

Brown

[11] 4,161,287

[45] Jul. 17, 1979

[54] VEHICLE LIQUID WINDOW WASHER BOTTLE AND ENCLOSURE

[75] Inventor: William J. Brown, Naperville, Ill.

[73] Assignee: Caterpillar Tractor Co., Peoria, Ill.

[21] Appl. No.: 814,236

[22] Filed: Jul. 8, 1977

[51] Int. Cl.² .............................................. B05B 3/18
[52] U.S. Cl. ............................. 239/284 R; 296/84 R
[58] Field of Search .................... 239/284 R; 296/1 R, 296/84 R

[56] References Cited

U.S. PATENT DOCUMENTS

| 2,673,762 | 3/1954 | Doyle, Jr. | 239/284 R |
| 3,008,649 | 11/1961 | Bock et al. | 239/284 R |

Primary Examiner—Richard A. Bertsch

Attorney, Agent, or Firm—Sixbey, Bradford & Leedom

[57] ABSTRACT

A vehicle liquid window washer bottle and enclosure therefor, the bottle being adapted for installation in an enclosure formed beneath an operator's seat in the cab of an earth working or construction vehicle and the like, the bottle having unique constructional features facilitating mounting and functional operation, the bottle having a neck extending from the enclosure into the cab, said bottle including a filler opening and a removable multiple purpose filler cap for closing the opening, the filler cap, in conjunction with the coacting structure, serving additionally as a seal between the enclosure and cab against noise and contaminant penetration thereinto.

5 Claims, 4 Drawing Figures

VEHICLE LIQUID WINDOW WASHER BOTTLE AND ENCLOSURE

BACKGROUND OF THE INVENTION

The present invention relates broadly to containers or reservoirs in the nature of bottles for containing and permitting operational dispensement therefrom of window washing liquids, and more particularly as applied to vehicles and equipment in the nature of earth working or construction vehicles and the like.

More specifically the invention has as a function or purpose thereof unique constructional and functional characteristics facilitating the mounting and securement of such a bottle in an operationally convenient area to an operator's cab, for the purpose of refilling the same for example, and the placement is desirably in an area or space not otherwise usable or used, space within the operator's cab normally being lacking.

Heretofore in vehicles of the nature involved utilization has not been made of existing, nonused areas or spaces within an operator's cab, for the disposition and mounting of apparatus in the nature of window washer liquid containing bottles or reservoirs, and it is a feature of the present invention to so utilize existing space, and at the same time provide increased availability and convenience factors, as regards its functional operation.

Also as is well known, vehicles of the type involved are frequently used in environments of heavy contaminants concentrations, such as dirt and the like, and penetration of such exterior contaminants into the operator's cab and/or into the window washing fluid are not desirable. Another feature of the present invention involves structure whereby penetration of such contaminants is substantially decreased and/or eliminated.

Another undesirable feature in vehicles of this type is the noise factor resulting from vehicle operation and/or the vehicle engine, which noise penetrates into the operator's cab normally, and increasedly so if openings to the exterior of the cab, and/or to other parts of the vehicle exist. It is accordingly desirable that such noise infiltration be diminished to any extent possible.

SUMMARY OF THE INVENTION

Accordingly the present invention is directed to a window washing fluid bottle container and enclosure therefor in a vehicle such as an earth working or construction type, wherein the bottle has unique constructional features which permit its mounting in an existing area, and which area provides improved ease of access and convenience for an operator in an operator's cab.

To this end, this feature of the present invention is accomplished by a mounting of the bottle in the area or space beneath the operator's seat in the operator's cab, the structure defining an enclosure for the bottle, and the construction making the same readily available to the operator for refilling. If necessary the adjustability of the operator's seat in, for example, a fore and aft movement can be utilized to expose the filler opening of the bottle with access being very convenient for the operator.

Another object and advantage, or feature, of the invention is to utilize a filler cap construction which, in conjunction with additional structure in the cab, serves not only as a filler cap closure but the filler cap also serves, at least in part, as a seal for the enclosure in which the bottle is mounted to diminish and/or prevent infiltration of noise into the operator's cab, and contaminant entrant or penetration into the cab.

More specifically the invention relates to specific features constituting an enclosure for a washer bottle in the operator's cab of an earth working or construction type vehicle, utilizing an already existing space or area under the operator's seat, and wherein a gasket and filler cap combination provides a seal against noise, dirt penetration and the like. The placement of the bottle is in the region beneath the operator's seat, not only for convenience, but also to utilize an existing space thereunder. The cap serves in conjunction with the gasket means to not only close the bottle, but additionally seals against noise and dirt penetration etc.

An additional feature of the invention resides in a construction of a mount for the operator's seat in the operator's cab which facilitates access to the bottle installation space and the structure of the filler bottle etc., as distinguished from heretofore known constructions. This is accomplished by providing a composite mount structure for the operator's seat which includes separable parts with joinder mating angles, sloping toward the floor from the rear of the operator's seat mount, and which are along the line of separation, the sloping angle providing ease of access, subsequent to separation, to the area wherein the window washer bottle is mounted.

The space utilized for mounting of the invention, and the manner of mounting, utilizes a removable access plate beneath the operator's seat, which is desirably removable for access to other components of the vehicle such, for example, as batteries for the vehicle.

An additional feature of the invention results from such installation of the bottle beneath the operator's seat, and the seal against infiltration of contaminants, as to prevent infiltration of dirt thereinto, so that this existing space can additionally favorably be utilized for the installation of air conditioning and/or heating equipment, and the installation does not detract from preventing entry of contaminants into the cab.

Additional objects, advantages and features of the invention will be more readily apparent from the following detailed description of an embodiment thereof when taken together with the accompanying drawings in which.

DETAILED DESCRIPTION

Figure 1:
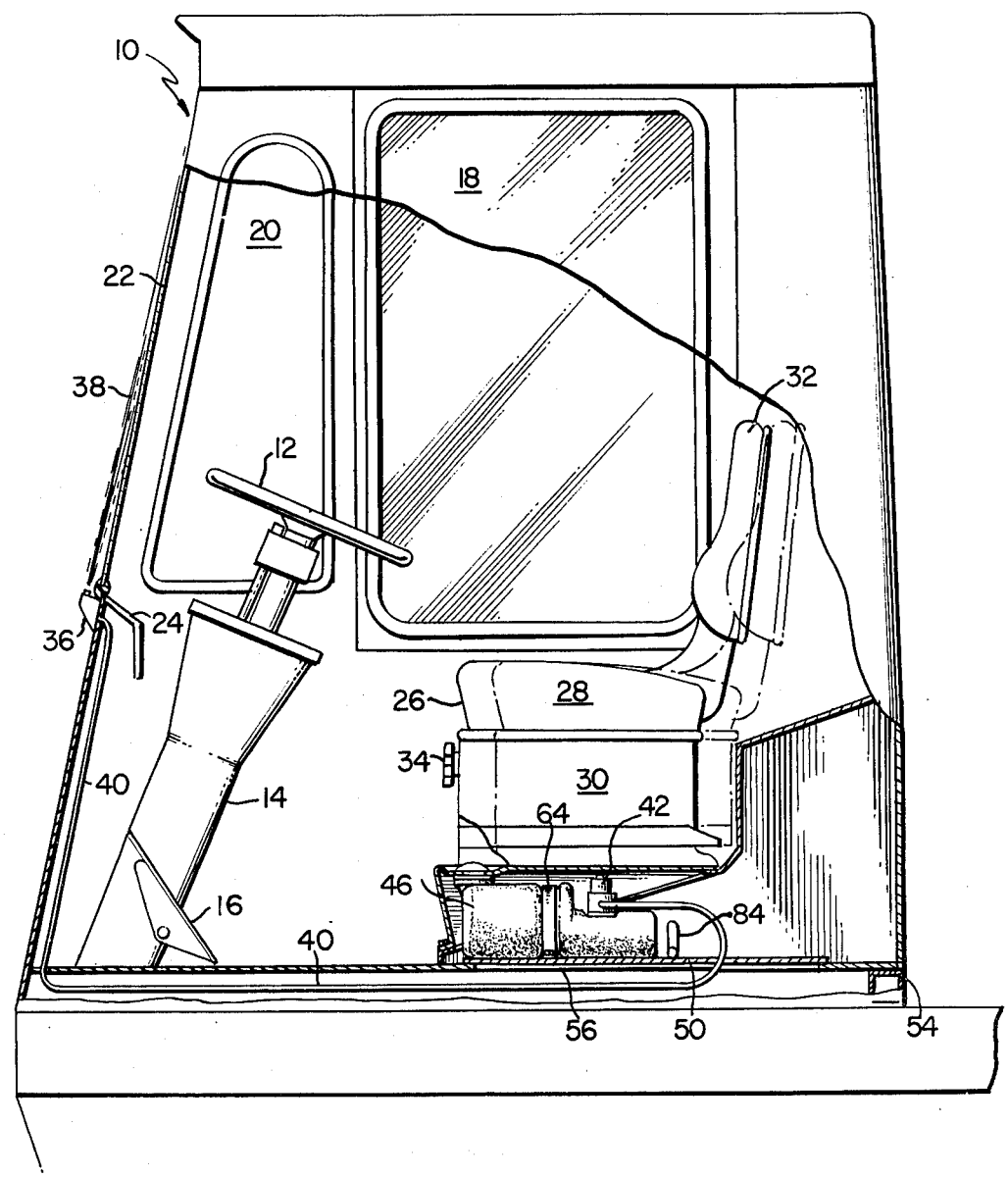
FIG. 1 is a fragmentary side elevational view of an operator's cab, partially broken away, with parts shown in cross-section for clarity of structure.

Referring now in detail to the drawings, there is shown in FIG. 1 an operator's cab 10 of a type normally associated with vehicles of the type in question, i.e., earth moving or construction vehicles, and adapted for containment of not only the vehicle operator, but functional control members such as steering wheel 12, mounted on a composite column generally indicated at 14, and which normally incorporates or operatively mounts controls used in the operation of the machine. A control foot pedal 16, which could be one of many, is shown. The cab is provided, as is usual, with a plurality of windows so that the operator can appropriately see to maneuver and control the vehicle, to accomplish the end purpose of the same. For example, FIG. 1 includes a side window 18, and a smaller forward side window 20 of a generally triangular configuration. Normally, similar windows would be on the opposite side of the operator's cab, and the window 18 for example might be on an entry door to the cab. A front window or windshield 22 is operatively mounted on the cab. A dashboard 24 or the like is placed below the front window. Many cabs include a rear window as will be referred to hereinafter, but the same is not shown in the drawings.

An operator's seat is generally indicated at 26, and which is of a known type including a cushion 28, a mounting base 30 and a back 32. The seat components shown in solid lines constitute a forward seat position, while the broken or phantom lines indicate a rearward position. An adjustment positioning securement knob is shown at 34 and which is operable in a usual manner. The fore and aft movement of the seat plays a part in the present invention as will be discussed hereinafter.

The present invention is more specifically directed to the windshield, or front window, washing equipment. To this end a spray nozzle generally indicated 36 is operatively positioned adjacent but below windshield 22, and windshield washing liquid will be issued therefrom in the nature of a spray, such as shown at 38. The usual windshield wiper is of course associated with the window and cooperates with the spray equipment to cleanse the window, thereby to permit operator viewing as required for operation of the vehicle. The problems of a clean window or windshield are of course greatly increased due to the environment of the operation, and type of operation, of the vehicles in question. In some instances, as will appear hereinafter, not only the front window or windshield is equipped with windshield washing and wiping apparatus, but the rear window in some types of vehicles is likewise equipped, since functional operation of some of these vehicles requires both forward and rearward movement and control, and therefore front and rear clean windows sufficient for the operator to see the terrain, and properly control function of the apparatus.

The spray nozzle is fed with the liquid through a hose 40 which is connected at one end into the spray nozzle 36. The other, or opposite end of hose 40 is operatively connected to a strainer pump unit of a known type, and generally designated at 42. A liquid intake tube 48 extends downwardly into bottle 46.

The bottle 46 is positioned and mounted on a removable access panel 50 below the driver's seat, and which in turn is supported on the cab floor plate 52. A support beam is shown intermediate an operator's platform 54, on which, or above which, the floor plate 52 is mounted, and on which the access panel 50 is superposed. An access opening is provided in the floor plate, as shown at 56, and which is covered by the access panel 50. The bottle 46 is mounted on the access panel and is movable, or removable, therewith.

Figure 4:
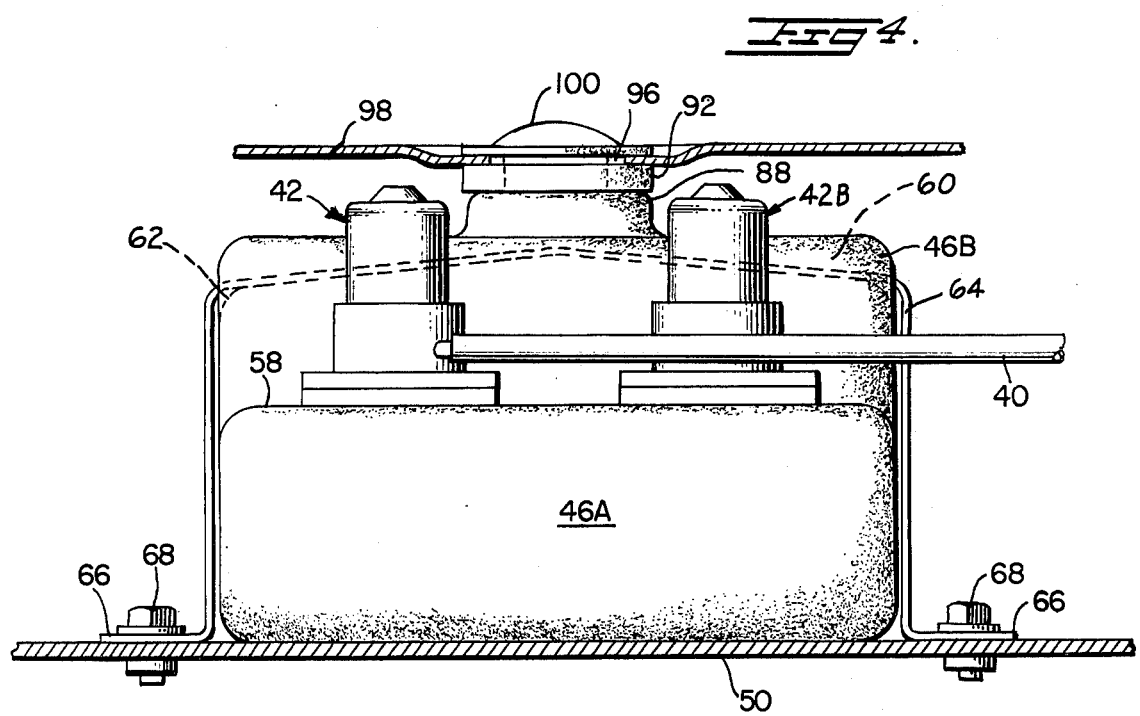
FIG. 4 is a detailed vertical sectional view taken along line 4—4 of FIG. 2.

As shown bottle 46 includes front and rear sections of different dimensions and configurations. The rear section 46A, of a smaller size, as shown, has a depressed or recessed area 58 on which the pump strainer unit 42 is mounted in any appropriate manner. The forward end 46B has a reduced portion in the nature of a recess at 60 which, as shown in FIG. 4, has an angled configuration as at 62 for a snug fit accommodation of a hold down strap 64, with the lower ends thereof 66 outwardly turned and bolted to access panel 50 by bolts and nuts as shown at 68. This configuration insures a snug hold down fit, and also a prevention of lateral movement of the bottle.

A second strainer pump unit 42B on the bottle can be used in the event that the rear window, or any other window, is to be provided with a spray jet for cleansing purposes and, as shown in FIG. 4, thus unit 42B in the present machine is not operatively attached.

The mounting platform or base 30 for the operator's seat includes a lower base portion or platform which is separable into two mating parts units. The platform part 70 supports and mounts the mounting base 30, which supports the cushion 28. The part 70 has an angular lower surface, indicated by dotted lines at 72, and a forward extending angular ledge 74. A base platform section 76 has an upper angularly disposed surface, shown at dotted lines 78, for mating and coacting with the surface 72. When the units or platforms portion 70 and 76 are assembled, with the interposition of a resilient gasket or the like 80 therebetween, they are secured by nut and bolt units 82. The upper platform 70 together with the seat base, and the seat thereabove, are removable as a unit and when this is done the walls of the so called surface 78 being at an angle provides easier access to the bottle 46, and to the access panel 50 for removal thereof together with bottle 46, and the access opening 56 is bared and can be used to obtain access to the region or area therebelow. In one constructional unit the area below the access opening 56 contains an electric battery system for the vehicle (not shown), and an access cover handle is affixed to the upper surface of access panel 50 to permit its withdrawal. As mentioned, the bottle 46 being mounted on the panel is movable therewith, unless disassociated by removal of bolts 68 securing the hold down strap or keeper 64 to the access panel. Hose 40 normally would be disconnected from pump strainer unit 42 prior to removal. This ease of access is as compared with a rectangular or square configuration of the lowermost platform. A straight or vertical front edge or surface would, as is readily apparent, complicate, or make more difficult access than does the sloping configuration as shown and described.

Figure 3:
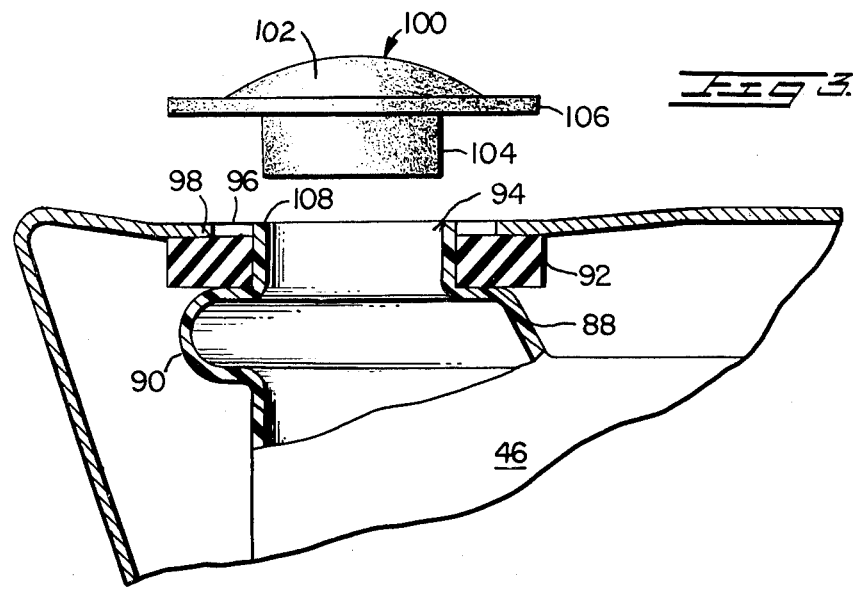
FIG. 3 is an enlarged fragmentary detailed sectional view of a portion of FIG. 2, with parts disposed in open condition, or position, for purposes of clarity of detail and operation.

The front larger bottle portion 46B permits, as is readily understandable, the storage or containment of a greater quantity of liquid in the bottle, and additionally serves to raise a filling neck portion, generally indicated at 88, to a position proximate the lower portion of the seat base. This neck portion includes a bead 90 which serves as a seat for a sealing member or ring 92 of resilient material, which surrounds the neck portion, per se, of the bottle neck at 94. An opening 96 is provided in operator's seat mounting plate 98, and neck 94 is inserted therethrough, as more clearly shown in FIG. 3. It will be noted that the seal ring 92 is in the nature of a resilient annulus, and provides a seal between the bead 90 of the bottle and the underside of the seat mounting plate 98.

The closure cap 100 is constructed of resilient material and includes a curvilinear top portion 102, and a lower annular area 104, of a size to snugly and sealingly engage in the interior of the neck 94 in an obvious manner. A ledge or flange 106 is intermediate the opposite ends 102, 104, and this engages on and over, in sealing relationship with, the upper end 108 of neck 94, and additionally is in sealing relation or engagement with the upper surface of seat mount plate 98 around the opening 96 therein.

This foregoing structure provides not only a seal for the bottle but also prevents movement of the bottle by the interengagement of various parts, and further provides a seal between the cab and the compartment or space below the operator's seat. This seal not only prevents noises in the cab by sealing from the exterior, but also seals off the compartment below the seat which can be utilized for containment of air conditioning, heating, or other apparatus containment.

Figure 2:
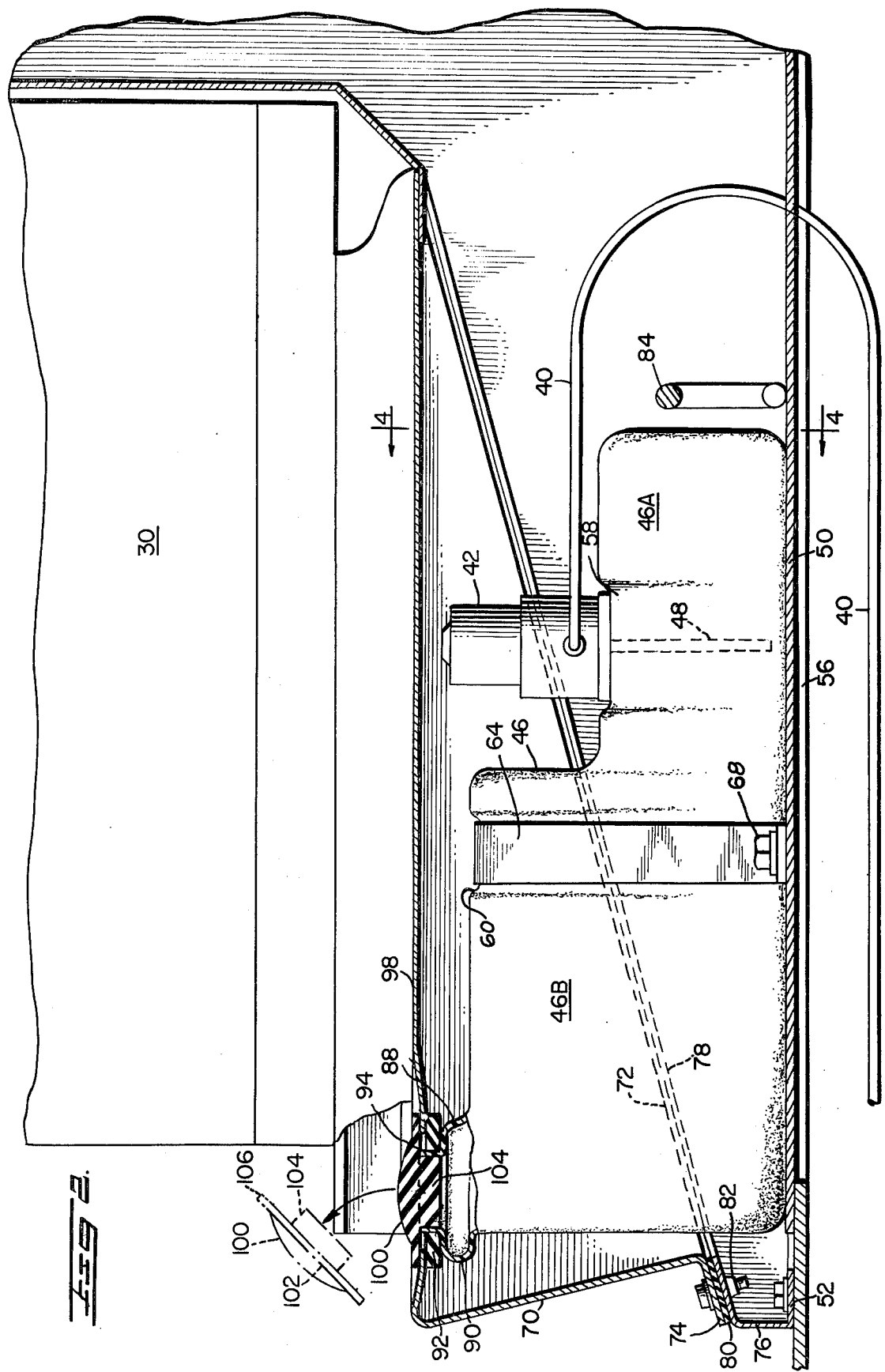
FIG. 2 is an enlarged fragmentary detailed sectional view of a portion of FIG. 1.

It will be apparent from FIGS. 1 and 2 of the drawing that the operator has access to the cap 100 in front of and below the operator's seat which, if necessary, can be moved on seat tracks 110 on opposite sides of the seat mount in a normal manner. The disconnected or removed condition of the filler cap 100 is indicated in broken or phantom lines in FIG. 2, with the arrow 112 indicating removal movement thereof.

If desired filters or the like can be utilized in the space or enclosure beneath the seat to increase cleanliness of inlet air etc.

The structure and operation of the invention will be readily apparent from the foregoing description, when taken together with the drawings. Manifestly changes in details of construction can be effected in the structure as shown and described without departing from the spirit and scope of the invention as defined in, and limited solely by, the appended claims.

What is claimed is:

1. An enclosure for a bottle adapted to contain a liquid for dispensement therefrom, said enclosure including surrounding walls, an upper one of said walls having a hole there-through, a bottle mounted on a bottom said wall and being securely attached thereon, said bottle including a neck extending therefrom and intercommunicating with the interior of the bottle, said neck extending through said hole and having a filling opening at the end thereof, a dispensing tube connected to said bottle, said neck having a bead thereon intermediate said filling opening and the body of said bottle, a resilient sealing annulus disposed between said bead and the underside of said upper wall and sealing the interior of said enclosure from the exterior, a filling opening closure cap having a lower annular portion resiliently engaged and sealed in said filling opening, said cap having a flange thereon above said lower annular portion, said flange being engageable over said hole in said upper wall and being in sealing engagement with the upper surface of said upper wall, and effecting a continuous seal extending from the neck terminal end, over the upper wall hole and the upper surface of said upper wall, said cap lower portion and said flange additionally coacting with said enclosure and said bottle neck to substantially eliminate movement of said bottle neck with respect to the upper wall hole in said enclosure.

2. An enclosure for a bottle as claimed in claim 1, said cap being resilient to enhance sealing of said filling opening, sealing of said upper wall hole, and frictional engagement with said bottle neck and said upper wall.

3. An enclosure for a bottle as claimed in claim 1, the body of said bottle having a top depression therein, and a holddown strap engaged in said depression and with ends thereof being secured to said bottom wall to prevent movement of the bottle with respect to the bottom wall and the enclosure.

4. An enclosure for a bottle as claimed in claim 3, said bottle including a first section and a second section, said first section having a larger diameter than said second section, pump strainer means connected on said second section, an intake tube connecting said pump and the interior of the bottle, said dispensing tube being connected to said pump strainer means and being operatively adapted for dispensing liquid from said bottle.

5. An enclosure for a bottle as claimed in claim 1, said bottle, and said enclosure within which said bottle is contained, being mounted beneath an operator's seat in a vehicle, and said closure cap being accessible to the operator beneath said seat, the vehicle including a windshield, means for spraying liquid on said windshield, and said tube interconnecting said bottle and said spray means.

* * * * *